United States Patent
Zhang

(10) Patent No.: US 10,961,939 B2
(45) Date of Patent: Mar. 30, 2021

(54) METHOD AND CONTROL DEVICE

(71) Applicant: CONTINENTAL AUTOMOTIVE GMBH, Hannover (DE)

(72) Inventor: Hong Zhang, Tegernheim (DE)

(73) Assignee: VITESCO TECHNOLOGIES GMBH, Hannover (DE)

(*) Notice: Subject to any disclaimer, the term of this patent is extended or adjusted under 35 U.S.C. 154(b) by 385 days.

(21) Appl. No.: 15/916,120

(22) Filed: Mar. 8, 2018

(65) Prior Publication Data
US 2018/0195453 A1 Jul. 12, 2018

Related U.S. Application Data

(63) Continuation of application No. PCT/EP2016/071011, filed on Sep. 7, 2016.

(30) Foreign Application Priority Data

Sep. 9, 2015 (DE) .................... 10 2015 217 246.5

(51) Int. Cl.
*F02D 41/24* (2006.01)
*F02D 41/00* (2006.01)
(Continued)

(52) U.S. Cl.
CPC .............. *F02D 41/247* (2013.01); *B60K 6/48* (2013.01); *B60W 10/02* (2013.01); *B60W 10/06* (2013.01);
(Continued)

(58) Field of Classification Search
CPC .. F02D 41/247; F02D 41/0087; F02D 41/009; F02D 41/1498; F02D 41/221;
(Continued)

(56) References Cited

U.S. PATENT DOCUMENTS 5,000,042 A 3/1991 Luebbering
6,376,927 B1 * 4/2002 Tamai ................ F16H 45/02
290/40 C (Continued)

FOREIGN PATENT DOCUMENTS

CN 1576549 A 2/2005
CN 1904337 A 1/2007
(Continued)

OTHER PUBLICATIONS

International Search Report and Written Opinion dated Dec. 16, 2016 from corresponding International Patent Application No. PCT/EP2016/071011.
(Continued)

*Primary Examiner* — Joseph J Dallo

(57) ABSTRACT

Example embodiments relate to a method and a control unit, wherein a drive system having an electric machine and having an internal combustion engine with at least a first cylinder and a crankshaft is provided. A fuel feed to at least the first cylinder of the internal combustion engine is deactivated, wherein the electric machine is coupled fixedly in terms of torque to the internal combustion engine. The electric machine is actuated such that the crankshaft of the internal combustion engine rotates at a predefined rotational speed, wherein a first cylinder segment time duration, which is assigned to the first cylinder, is detected. A corrective value is determined in a manner dependent on the first cylinder segment time duration.

18 Claims, 3 Drawing Sheets

(51) Int. Cl.
  *F02D 41/14* (2006.01)
  *B60K 6/48* (2007.10)
  *B60W 10/06* (2006.01)
  *B60W 10/08* (2006.01)
  *B60W 10/02* (2006.01)
  *B60W 20/50* (2016.01)
  *F02D 41/22* (2006.01)

(52) U.S. Cl.
  CPC ........... *B60W 10/08* (2013.01); *B60W 20/50* (2013.01); *F02D 41/009* (2013.01); *F02D 41/0087* (2013.01); *F02D 41/1498* (2013.01); *B60Y 2200/92* (2013.01); *F02D 41/221* (2013.01); *F02D 2200/101* (2013.01); *Y10S 903/902* (2013.01)

(58) Field of Classification Search
  CPC . F02D 2200/101; B60W 10/02; B60W 20/50; B60W 10/06; B60W 10/08; B60K 6/48; B60Y 2200/92; Y10S 903/902
  See application file for complete search history.

(56) References Cited

U.S. PATENT DOCUMENTS

| | | | |
|---|---|---|---|
| 2002/0062806 A1* | 5/2002 | Suzuki | B60W 10/08 123/179.3 |
| 2002/0179047 A1* | 12/2002 | Hoang | B60K 6/485 123/350 |
| 2005/0061064 A1 | 3/2005 | Bruns | |
| 2007/0298891 A1 | 12/2007 | Voss et al. | |
| 2008/0133111 A1 | 6/2008 | Buslepp et al. | |
| 2009/0076707 A1 | 3/2009 | Sugiyama et al. | |
| 2012/0197471 A1* | 8/2012 | Irisawa | B60K 6/445 701/22 |
| 2012/0203411 A1 | 8/2012 | Mallebrein et al. | |
| 2013/0325300 A1 | 12/2013 | Walter et al. | |
| 2015/0088402 A1 | 3/2015 | Girotto et al. | |
| 2016/0069290 A1* | 3/2016 | Radeczky | F02D 41/123 701/22 |
| 2017/0211495 A1* | 7/2017 | Alobiedat | F02D 41/1458 |

FOREIGN PATENT DOCUMENTS

| | | |
|---|---|---|
| CN | 101903629 A | 12/2010 |
| CN | 104471220 A | 3/2015 |
| CN | 104854331 A | 8/2015 |
| DE | 10318839 B3 | 6/2004 |
| DE | 10302058 A1 | 7/2004 |
| DE | 102004062049 A1 | 7/2006 |
| DE | 102004062409 A1 | 7/2006 |
| DE | 102006020434 A1 | 11/2007 |
| DE | 102007043607 A1 | 3/2009 |
| DE | 102008038824 A1 | 8/2009 |
| DE | 102009013142 A1 | 9/2010 |
| EP | 1272858 A2 | 1/2003 |
| EP | 1491751 A1 | 12/2004 |
| EP | 1750111 A1 | 2/2007 |
| GB | 2397851 A | 8/2004 |
| JP | 2007290663 A | 11/2007 |
| JP | 4123254 B2 | 7/2008 |
| JP | 4277677 B2 | 6/2009 |

OTHER PUBLICATIONS

German Office Action dated Dec. 2, 2015, for corresponding German Patent Application No. 10 2015 217 246.5.
German Office Action dated May 12, 2016 for corresponding German Patent Application No. 10 2015 217 246.5.
Korean Notice to Submit Response dated Feb. 12, 2019 for the counterpart Korean Patent Application No. 10-2018-7009745.
Korean Notice of Allowance dated Jun. 26, 2019 for the counterpart Korean Patent Application No. 10-2018-7009745.
Chinese First Office Action dated Jun. 11, 2020 for the counterpart Chinese Patent Application No. 201680052484.1.

\* cited by examiner

METHOD AND CONTROL DEVICE

CROSS REFERENCE TO RELATED APPLICATIONS

This application is a continuation of International application No. PCT/EP2016/071011, filed Sep. 7, 2016, which claims priority to German application No. 10 2015 217 246.5, filed on Sep. 9, 2015, each of which is hereby incorporated by reference herein in its entirety.

FIELD OF INVENTION

The invention relates to a method for determining a corrective value for a drive system and to a control unit.

DE 10 2004 062 409 B4 has disclosed a method and a device for the correction of cylinder segment time durations of an internal combustion engine.

SUMMARY

It is an object of the invention to provide an improved method for determining a corrective value for a drive system, and an improved control unit.

It has been identified, according to embodiments of the invention, that an improved control unit and an improved method may be provided by virtue of a drive system having an electric machine and having an internal combustion engine with at least a first cylinder and a crankshaft being provided, wherein a fuel feed to at least the first cylinder of the internal combustion engine is deactivated, wherein the electric machine is coupled fixedly in terms of torque to the internal combustion engine, and wherein the electric machine is actuated such that the crankshaft of the internal combustion engine rotates at a predefined rotational speed. Furthermore, a first cylinder segment time duration, which is assigned to the first cylinder, is detected. A corrective value is determined in a manner dependent on the first cylinder segment time duration.

On the basis of the corrective value, an injector characteristic curve of an injector of the first cylinder may be adapted, such that the fuel quantity injected into the first cylinder corresponds exactly to the fuel quantity to be injected. Furthermore, irregular operation of the first cylinder may be detected particularly easily.

In a further embodiment, the fuel feed to a second cylinder of the internal combustion engine is deactivated. A second cylinder segment time duration, which is assigned to the second cylinder, is detected, wherein a cylinder segment duration difference is determined from a reference time duration and the second cylinder segment time duration, and wherein the cylinder segment duration difference is taken into consideration in the determination of the corrective value.

In a further embodiment, the cylinder segment duration difference is compared with a predefined threshold value, wherein, in the event of the predefined threshold value being exceeded, the corrective value is determined on the basis of the cylinder segment duration difference.

In a further embodiment, on the basis of the corrective value and the second cylinder segment time duration, a corrected cylinder segment time duration is set for the detection of an irregularity in a combustion in the second cylinder.

In a further embodiment, the first cylinder segment time duration is set as reference time duration, wherein the corrective value is selected such that the corrected second cylinder segment time duration is substantially adapted to the first cylinder segment time duration in the case of a constant rotational speed of the crankshaft. The corrected second cylinder segment time duration is taken into consideration during monitoring of a combustion process of the second cylinder.

In a further embodiment, a fuel feed to the first cylinder is activated, and a minimum quantity is delivered into the first cylinder, wherein a further first cylinder segment time duration is detected, wherein a further cylinder segment duration difference is determined on the basis of a difference between the further first cylinder segment time duration and the first cylinder segment time duration, wherein the corrective value is determined on the basis of the further cylinder segment duration difference, and wherein an injector characteristic of an injector of the first cylinder is adapted on the basis of the corrective value.

In a further embodiment, during the feed of the minimum quantity into the first cylinder, the fuel feed to at least the second cylinder is deactivated or activated.

In a further embodiment, the first cylinder segment time duration is detected in a high-pressure phase of the first cylinder.

In a further embodiment, during the determination of the corrective value, the internal combustion engine and the electric machine are decoupled from a transmission device in the drivetrain. In this way, the cylinder segment time duration may be determined independently of driving dynamics.

In a further embodiment, after determination of the corrective value, the fuel feed to the cylinders is fully activated, and a power of the electric machine is reduced, or, after determination of the corrective value, the fuel feed to the cylinders is deactivated, and a power of the electric machine is reduced or increased or the electric machine is operated as a generator.

BRIEF DESCRIPTION OF THE DRAWINGS

The above-described characteristics, features and advantages of this invention and the manner in which they are achieved will become clearer and more distinctly comprehensible in connection with the following description of the example embodiments, which will be discussed in more detail in connection with the drawings, in which.

DETAILED DESCRIPTION

Figure 1:
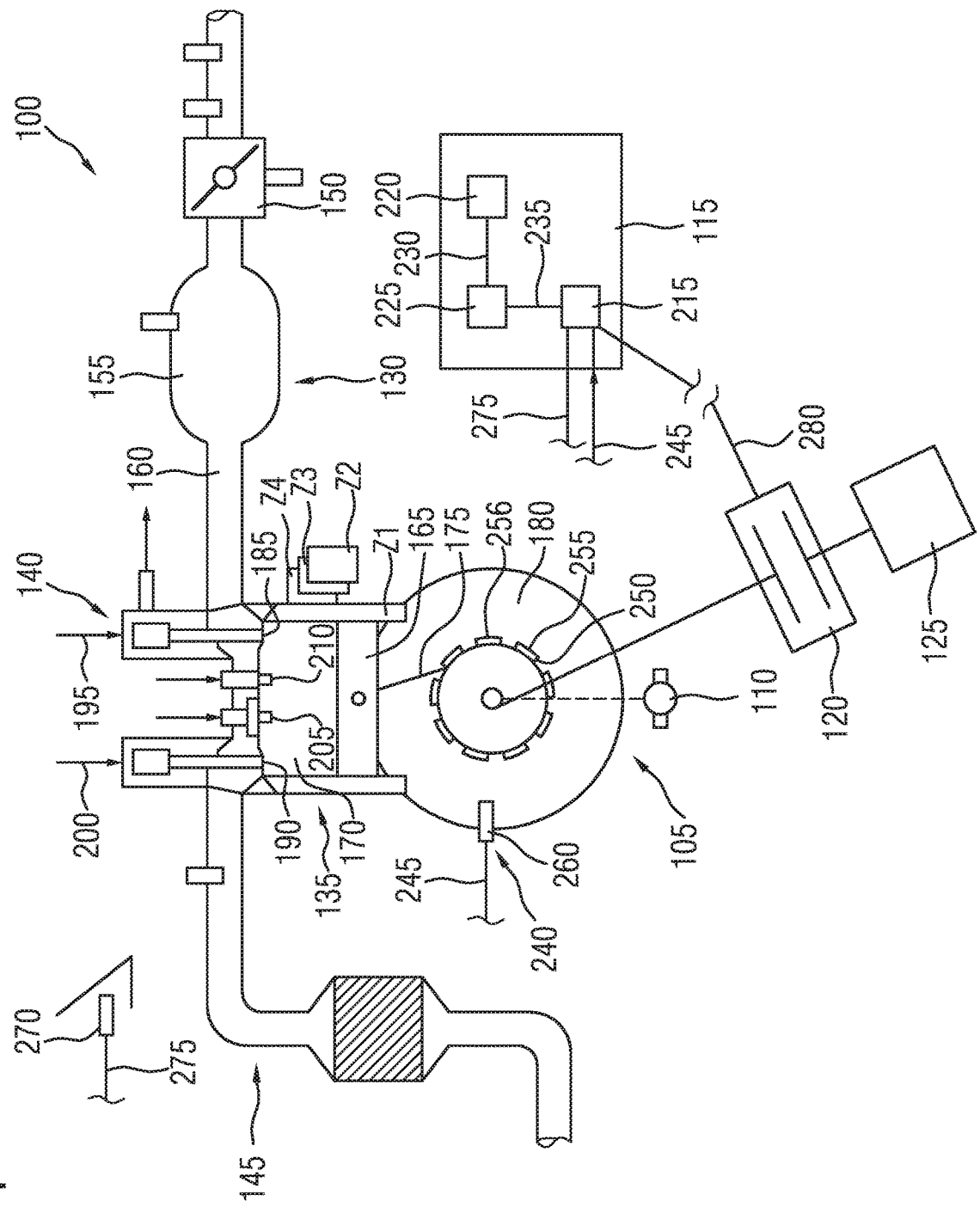
FIG. 1 is a schematic illustration of a drive system.

FIG. 1 is a schematic illustration of a drive system 100. The drive system 100 is designed for driving a vehicle, in particular a motor vehicle.

The drive system 100 has an internal combustion engine 105, at least one electric machine 110, a control unit 115, and at least one clutch device 120. The drive system 100 is switchably connectable to a transmission device 125 by means of the clutch device 120.

The internal combustion engine 105 includes an intake tract 130, and engine block 135, a cylinder head 140 and an exhaust tract 145.

The intake tract 130 includes a throttle flap 150, an intake pipe 155 and a manifold 160. The engine block 135 has at least one first cylinder $Z_1$ and at least one second cylinder $Z_2$. In FIG. 1, by way of example, the first cylinder $Z_1$ of the cylinders $Z_1$, $Z_2$, $Z_3$, $Z_4$ is illustrated. The internal combustion engine 105 may self-evidently also have some other number of cylinders $Z_1$, $Z_2$. For example, the internal combustion engine 105 as is symbolically illustrated in FIG. 1 may be formed as a four-cylinder engine with four cylinders $Z_1$, $Z_2$, $Z_3$, $Z_4$. The cylinders $Z_1$, $Z_2$, $Z_3$, $Z_4$ are advantageously of identical form. Here, in each cylinder $Z_1$, $Z_2$, $Z_3$, $Z_4$, there is arranged in each case one piston 165 which delimits a combustion chamber 170 in sections. The piston 165 is connected by means of a connecting rod 175 to a crankshaft 180 of the engine block 135.

The cylinder head 140 includes a valve drive with an inlet valve 185, with at least one outlet valve 190, with a first valve drive 195, which is assigned to the inlet valve 185, and with a second valve drive 200, which is assigned to the outlet valve 190.

Furthermore, the cylinder head 140 may have an ignition plug 210 and/or an injector 205. It is advantageously the case that an injector 205 is provided for each cylinder $Z_1$, $Z_2$, $Z_3$, $Z_4$, which injector injects fuel into the combustion chamber when in the activated state. The injector 205 may alternatively also be arranged in the intake pipe 155. The ignition plug 210 may also be omitted. This may be the case in particular if the internal combustion engine 105 is in the form of a diesel engine.

The electric machine 110 is, in the embodiment, connected fixedly in terms of torque to the crankshaft 180. Furthermore, between the crankshaft 180 and the electric machine 110, there may additionally be provided a further clutch device (not illustrated) which switchably connects the electric machine 110 to the crankshaft 180 of the internal combustion engine 105. Here, the further clutch device may be connected to the control unit 115.

The control unit 115 has an interface 215, a memory 220 and a control device 225. The control device 225 is connected by means of a first connection 230 to the memory 220. The control device 225 is connected by means of a second connection 235 to the interface 215. The interface 215 may be connected to various actuators and further control devices or components (not illustrated) of the drive system 100, which will not be discussed below unless necessary.

A predefined threshold value and optionally an additional predefined further threshold value and/or a predefined setpoint value may be stored in the memory 220. Furthermore, an algorithm for carrying out the method described below in FIGS. 2 and 3 may be stored in the memory 220. Furthermore, in the memory 220, there may be stored a first cylinder segment time duration $t_{S1}$, which is stored in predefined fashion for the first cylinder $Z_1$, and a second cylinder segment time duration $t_{S2}$, which is stored for the second cylinder $Z_2$. Furthermore, in the memory 220, there may be stored a control method for the operation of the internal combustion engine 105 and/or of the electric machine 110.

The drive system 100 furthermore has a crankshaft sensor 240. The crankshaft sensor 240 has an encoder wheel 250. The encoder wheel 250 preferably has a multiplicity of teeth 255 which are arranged at regular intervals in a circumferential direction. It is advantageously additionally the case that one widened gap 256 is provided between the teeth 255 on the encoder wheel 250, which widened gap correlates for example with a top dead center of the piston 165 of the first cylinder $Z_1$.

The crankshaft sensor 240 furthermore has a sensor element 260 which is connected by means of a fourth connection 265 to the interface 215 of the control unit 115. The sensor element 260 may be formed for example as a Hall element, the measurement signal of which is representative of a contour of the encoder wheel 250. The sensor element 260 may however also be of some other design; for example, the sensor element 260 may also exhibit optical detection.

During normal operation, the control unit 115 controls the internal combustion engine 105 and the electric machine 110, for example, in a manner dependent on a driver demand expressed by a pedal position encoder 270. The pedal position encoder 270 is connected by means of a fifth connection 275 to the interface 215 of the control unit 115.

Furthermore, the clutch device 120 may be connected by means of a sixth connection 280 to the interface 215.

The drive system 100 may exhibit different operating states. Accordingly, in a first operating state, a torque for driving the vehicle may be generated exclusively by means of the internal combustion engine 105. Alternatively, the torque may also be provided exclusively by means of the electric machine 110. Furthermore, operation of the electric machine 110 as a generator is possible, while at the same time the internal combustion engine 105 provides the torque for both driving the electric machine 110 and simultaneously moving the vehicle. Furthermore, in a hybrid operating state, the torque for driving the vehicle may be generated both by the electric machine 110 and by the internal combustion engine 105.

The torque provided by the internal combustion engine 105 and/or electric machine 110 is conducted by the closed clutch device 120 to the transmission device 125, which in turn conducts the torque, for example, to drive wheels of the vehicle.

Figure 2:
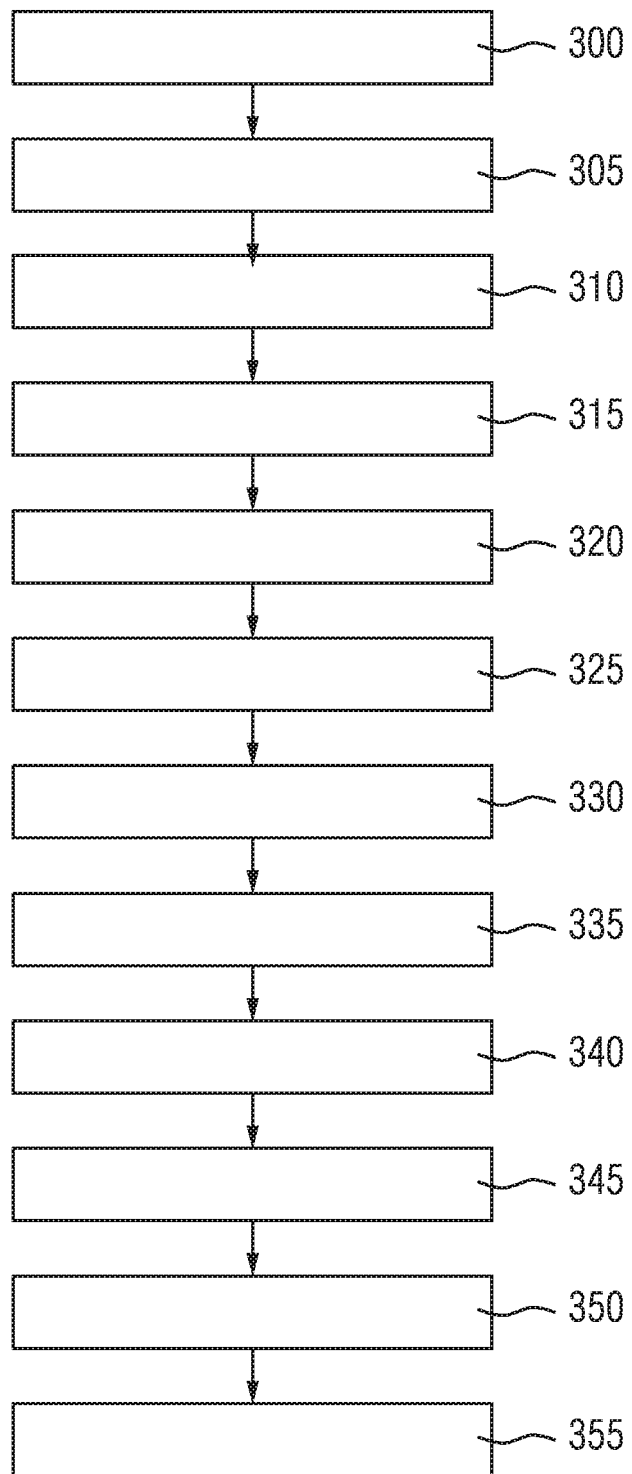
FIG. 2 shows a flow diagram of a method according to a first embodiment for controlling the drive system shown in FIG. 1.

FIG. 2 shows a flow diagram of a method for controlling the drive system 100 shown in FIG. 1. The method described below will be discussed by way of example for the first cylinder $Z_1$ and the second cylinder $Z_2$. Here, the second cylinder $Z_2$ is used as an example for the further cylinders $Z_3$, $Z_4$. The method steps performed for the second cylinder $Z_2$ may be performed correspondingly for the further cylinders $Z_3$, $Z_4$.

In a first method step 300, the control device 225 checks whether the drive system 100 is decoupled from the transmission device 125. This may be realized for example by virtue of the clutch device 120 providing an information signal regarding its state (for example open or closed) to the interface 215. The interface 215 provides the information signal to the control device 225. If the clutch device 120 is closed, then the control device 225 may either open the clutch device 120 by means of a control signal, or wait until an operating state of the drive system 100 is present in which the clutch device 120 is open. If the clutch device 120 is open, then the control device 225 progresses with a second method step 305.

In the second method step 305, a fuel feed to at least one of the cylinders $Z_1$, $Z_2$, $Z_3$, $Z_4$, preferably to all cylinders $Z_1$, $Z_2$, $Z_3$, $Z_4$, is interrupted by the control device 225.

In a third method step 310, which may be performed in parallel or in series with respect to the second method step 305, the electric machine 110 is activated by the control device 225. The activation and deactivation of the fuel feed in the second and third method steps 305, 310 may be performed such that, at the same time as the electric machine 110 is started up, the fuel feed is continuously reduced, such that the crankshaft 180 rotates substantially with a constant predefined rotational speed n. Alternatively, in the third method step 310, the crankshaft 180 may be accelerated or braked to the predefined rotational speed n.

In a fourth method step 315, the control device 225 actuates the electric machine 110 such that the predefined rotational speed n of the crankshaft 180 of the internal combustion engine 105 is kept constant over a predefined time interval. In the predefined time interval, the further method steps 320 to 345 are performed. Here, the predefined rotational speed n may correspond to an idle rotational speed of the internal combustion engine 105. The control device 225 may also actuate the electric machine 110 such that the predefined rotational speed n differs from the idle rotational speed, but is lower than a maximum rotational speed of the internal combustion engine 105.

Here, the predefined rotational speeds are represented by a predefined speed of rotation of the crankshaft 180. Here, the electric machine 110 is actuated such that the predefined rotational speed n corresponds as exactly as possible to the predefined setpoint value, which is stored in a memory of the control device 225. For this purpose, the electric machine 110 exhibits suitable open-loop and/or closed-loop control means, which may physically also be part of the control device 225 and which, in the case of the closed-loop control, advantageously sets the speed of rotation of the crankshaft 180 or the speed of rotation of an output shaft of the electric machine 110 in a manner independent of a measurement signal of the crankshaft sensor 240. The open-loop control of the electric machine 110 is configured such that the crankshaft 180 rotates with desired predefined uniformity following the fourth method step 315.

In a fifth method step 320, at least for the first cylinder $Z_1$, in a high-pressure phase for at least one first cylinder segment of the angle range of the crankshaft 180 of the internal combustion engine 105, a first cylinder segment time duration $t_{S1}$, which is assigned to the first cylinder $Z_1$, is detected. Also, in the fifth method step 320, for the second cylinder $Z_2$, for a second cylinder segment of the angle range of the crankshaft 180, a second cylinder segment time duration $t_{S2}$, which is assigned to the second cylinder $Z_2$, may be detected.

This may, for example, be realized in that the control device 225 detects corresponding flanks of the measurement signal of the sensor element 260 in a manner dependent on the geometrical design of the encoder wheel 250, and detects the respective cylinder segment time duration $t_{S1}$, $t_{S2}$ of a predefined number of tooth flanks which are representative of the respective cylinder segment of the cylinder $Z_1$, $Z_2$.

In a sixth method step 325, the determined cylinder segment time durations $t_{S1}$, $t_{S2}$ are (temporarily) stored in the memory 220.

In a seventh method step 330, one of the cylinder segment time durations $t_{S1}$, $t_{S2}$, for example the first cylinder segment time duration $t_{S1}$ of the first cylinder $Z_1$, is assigned to a cylinder reference time duration $t_R$. It is also conceivable for the cylinder reference time duration $t_R$ to be determined by the control device 225 by means of a predefined characteristic map which is stored in the memory 220. The cylinder reference time duration $t_R$ may additionally be stored permanently, as a first reference value $R_1$ for the first cylinder $Z_1$, in the memory 220.

In an eighth method step 335, for that cylinder $Z_1$, $Z_2$ which does not serve as reference cylinder, for example the second cylinder $Z_2$, the control device 225 determines a cylinder segment duration difference $\Delta t_{S2}$, assigned to the second cylinder $Z_2$, by a calculating a difference between the cylinder segment time duration $t_{S2}$ assigned to the second cylinder $Z_2$ and the cylinder reference time duration $t_R$. For that cylinder $Z_1$, $Z_2$ which serves as reference cylinder, for example the first cylinder $Z_1$, the eighth method step 335 is skipped.

The cylinder segment duration difference $\Delta t_{S2}$ may for example be a percentage difference between the cylinder segment time duration $t_{S2}$ of the second cylinder $Z_2$ and the cylinder reference time duration $t_R$ of the reference cylinder $Z_1$.

In a ninth method step 340, the control device 225 stores the cylinder segment duration difference $\Delta t_{S2}$ determined for the second cylinder $Z_2$ in the memory 220 in a manner assigned to the second cylinder $Z_2$.

In a tenth method step 345, the control device 225 compares the cylinder segment duration difference $\Delta t_{S2}$ assigned to the second cylinder $Z_2$ with a predefined threshold value stored in the memory 220.

If the cylinder segment duration difference $\Delta t_{S2}$ determined for the second cylinder $Z_2$ falls below the predefined threshold value, then the control device 225 (permanently) stores the second cylinder segment time duration $t_{S2}$, determined for the second cylinder $Z_2$, in the memory 220 as a second reference value $R_2$ for the second cylinder $Z_2$.

If the cylinder segment duration difference of the second cylinder $Z_2$ exceeds the predefined threshold value, then the control device 225 determines a corrective value K for the second cylinder $Z_2$ on the basis of the cylinder segment duration difference $\Delta t_{S2}$.

The corrective value K may be determined, for example, such that the determined second cylinder segment time duration $t_{S2}$ of the second cylinder $Z_2$ is changed by the corrective value K such that a corrected second cylinder segment time duration $t_{S2}$ of the second cylinder $Z_2$ substantially corresponds to the reference cylinder $Z_1$.

The control device 225 permanently stores the corrected cylinder segment time duration $t_{S2}$ of the second cylinder $Z_2$ as a second reference value $R_2$ in the memory 220. If a second reference value $R_2$ is possibly already stored in the memory 220 for the second cylinder $Z_2$, said value will be overwritten.

In an eleventh method step 350, the control device 225 activates the fuel feed to the internal combustion engine 105 and activates the internal combustion engine 105. At the same time, the electric machine 110 is actuated by the control device 225 such that the electric machine 110 provides a torque which is reduced by the torque provided by the internal combustion engine 105, such that the predefined rotational speed n continues to be substantially maintained. Here, the control device 225 increases the fuel feed to such an extent that the torque output by the electric machine 110 may be reduced completely, and the drive system 100 is operated exclusively by means of the internal combustion engine 105, and the electric machine 110 is possibly operated, in a manner driven by the internal combustion engine 105, in a generator mode. Alternatively, a power of the electric machine 110 is increased, while the internal combustion engine 105 remains deactivated. During sailing operation of the vehicle, it is also conceivable for the electric machine 110 to be operated in the generator mode while the internal combustion engine 105 remains deactivated.

In a twelfth method step 355, the drive system 100 may be coupled fixedly in terms of torque to the transmission device 125 again by virtue of the clutch device 120 being closed. The eleventh and twelfth method steps 350, 355 may be performed at the same time, in a manner synchronized in terms of time.

During the normal operation of the drive system 100, the control device 225 detects the cylinder segment time durations $t_{NS1}$, $t_{NS2}$ of the respective cylinders $Z_1$, $Z_2$, similarly to the situation described in the third method step 310. The cylinder segment time durations $t_{NS1}$, $t_{NS2}$ determined during normal operation are compared by the control device 225 with the (possibly corrected) cylinder segment time durations $t_{S1}$, $t_{S2}$, stored in the memory 220 as reference value $R_1$, $R_2$, of the respectively associated cylinder $Z_1$, $Z_2$. In the event that the cylinder segment time durations $t_{NS1}$, $t_{NS2}$ of the cylinder $Z_2$, $Z_3$, $Z_4$ determined during normal operation deviate by a further predefined threshold value, the control device 225 may reliably detect irregularities in the combustion, in particular misfiring events, in the corresponding cylinder $Z_1$, $Z_2$, and may correspondingly actuate the cylinder $Z_1$, $Z_2$, $Z_3$, $Z_4$ that exhibits misfiring events.

Figure 3:
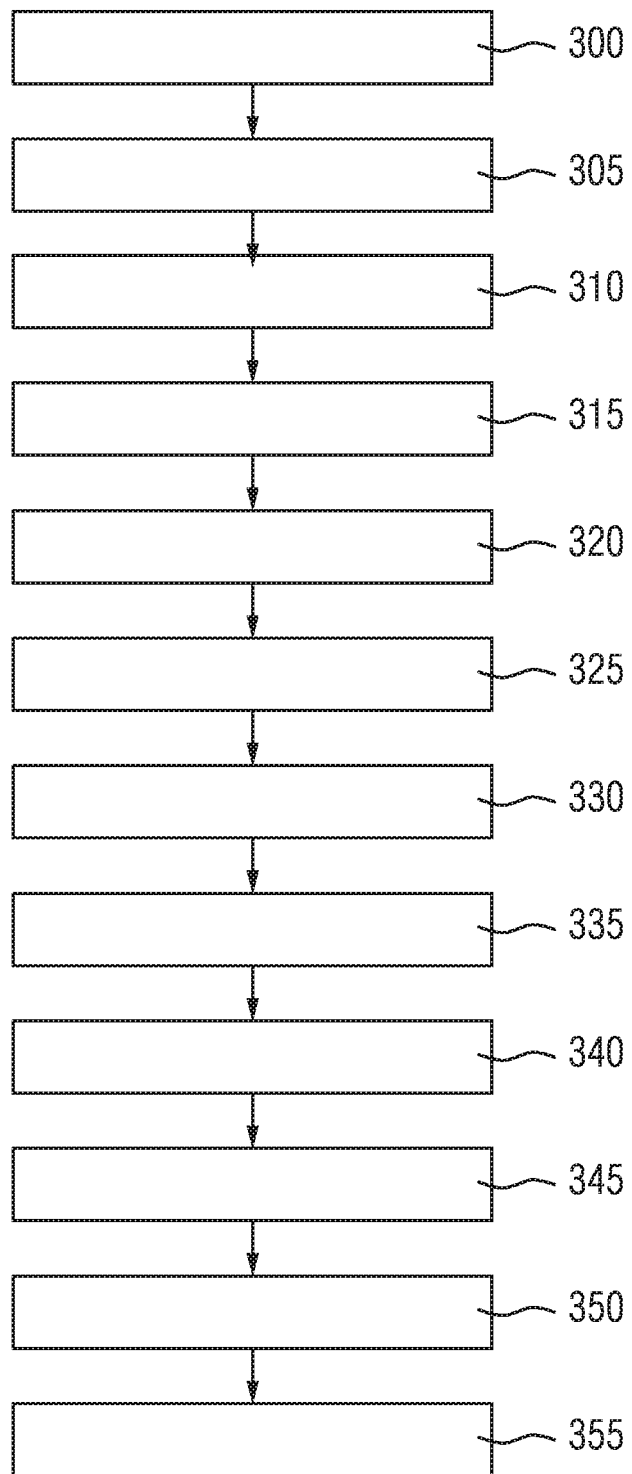
FIG. 3 shows a flow diagram of a method according to a second embodiment for controlling the drive system shown in FIG. 1.

FIG. 3 shows a flow diagram of a method for operating the drive system 100 shown in FIG. 1 as per a second embodiment. The method will, as in FIG. 2, be discussed on the basis of the first and second cylinders $Z_1$, $Z_2$. That which is discussed for the second cylinder also applies to the further cylinders.

In a first method step 300, which corresponds to the first method step 300 described in FIG. 2, the control device 225 checks whether the clutch device 120 is open or closed. If the clutch device 120 is closed, then the control device 225 may either open the clutch device 120 by means of a control signal, or wait until an operating state of the vehicle is present in which the clutch device 120 is open. If the clutch device 120 is open, then the control device 225 progresses with a second method step 305.

In the second method step 305, the electric machine 110 is activated and is coupled fixedly in terms of torque to the internal combustion engine 105.

In a third method step 310, the control device 225 actuates the electric machine 110, for example on the basis of a characteristic map stored in the memory 220, such that the crankshaft 180 rotates at a predefined rotational speed. At the same time, the control device 225 deactivates at least one of the cylinders $Z_1$, $Z_2$, $Z_3$, $Z_4$, for example the first cylinder $Z_1$. It is particularly advantageous for all of the cylinders $Z_1$, $Z_2$, $Z_3$, $Z_4$ to be deactivated. Here, the electric machine 110 is actuated by the control device 225 such that the rotational speed of the crankshaft 180 substantially corresponds to the predefined rotational speed n. For example, as a predefined rotational speed n, the idle rotational speed of the internal combustion engine 105 may be maintained.

Here, an open-loop and/or closed-loop control algorithm may be stored in the memory 220, such that the rotational speed of the crankshaft 180 substantially corresponds to the predefined rotational speeds. Here, the open-loop and/or closed-loop control of the electric machine 110 and of the internal combustion engine 105 is performed such that the rotational speed of the crankshaft 180 may be set independently of a measurement signal of the sensor element 260 of the crankshaft sensor 245. Furthermore, the open-loop control of the electric machine 110 and of the internal combustion engine 105 is performed such that the rotational speed of the crankshaft 180 exhibits desired high uniformity.

In a fourth method step 315, the control device 225 detects a sensor signal of the sensor element 260 of the crankshaft sensor 180 via the interface 215. Here, the detected sensor signal corresponds to the geometrical design of flanks of the teeth 255 of the encoder wheel 250. Here, each cylinder $Z_1$, $Z_2$, $Z_3$, $Z_4$ is assigned in each case one angle range of the detected measurement signal.

In a fifth method step 320, the control device 225 determines a first cylinder segment time duration $t_{S1}$ for the first cylinder $Z_1$ of the internal combustion engine 105 on the basis of the measurement signal.

In a sixth method step 325, the control device 225 stores the determined first cylinder segment time duration $t_{S1}$ of the first cylinder $Z_1$ in the memory 220.

The control device 225 repeats the third to sixth method steps 310-325 for the other (second) cylinder, and stores the respective cylinder segment time duration $t_{S2}$, $t_{S3}$, $t_{S4}$ respectively determined for the cylinder $Z_2$, $Z_3$, $Z_4$ in the memory 220 in a manner assigned to the respective cylinder $Z_2$, $Z_3$, $Z_4$.

Here, the first cylinder, which was deactivated during the preceding execution of the third to sixth method steps 310 to 325, is activated.

The control device 225 progresses with a seventh method step 330 when the control device 225 has, for all cylinders $Z_1$, $Z_2$, $Z_3$, $Z_4$, stored the respectively determined cylinder segment time durations $t_{S1}$, $t_{S2}$, $t_{S3}$, $t_{S4}$ in the memory 220.

In the seventh method step 330, the control device 225 controls the drive system 100 as described in the third method step, but a minimum quantity of fuel is injected by means of the injector 205 into the first cylinder $Z_1$. The control device 225 determines a further first cylinder segment time duration $t_{S1}'$ from the measurement signal of the sensor element 260.

In an eighth method step 335, the control device 225 determines a first cylinder segment duration difference $\Delta t_{S1}$ on the basis of the first cylinder segment time duration $t_{S1}$ and the further first cylinder segment time duration $t_{S1}'$. The cylinder segment duration difference $\Delta t_{S1}$ correlates here with a torque that is generated by the minimum quantity of fuel in the first cylinder.

In a ninth method step 340, the control device 225 stores the first cylinder segment duration difference $\Delta t_{S1}$ for the first cylinder $Z_1$ in the memory 220.

In a tenth method step 345, the control device 225 determines a first corrective value $K_1$ for the first cylinder $Z_1$ on the basis of the cylinder segment duration difference $\Delta t_{S1}$.

The first corrective value $K_1$ may, for example, be determined by virtue of an injected fuel quantity of the injector 205 into the first cylinder $Z_1$ being determined on the basis of the first cylinder segment duration difference $\Delta t_{S1}$ and an injector characteristic curve stored in the memory 220. The determined injected fuel quantity may be compared with a setpoint value for the injected minimum quantity. If the setpoint value substantially corresponds to the determined injected fuel quantity, then the control device 225 maintains the injector characteristic curve stored in the memory 220. If the injected fuel quantity deviates from the setpoint value by a predefined threshold value, then the control device 225 determines the first corrective value $K_1$ on the basis of the injected fuel quantity and the injector characteristic curve. Here, the first corrective value $K_1$ may correspond to an offset of the injector characteristic curve of the injector of the first cylinder $Z_1$.

On the basis of the first corrective value $K_1$ and the injector characteristic curve, the control device 225 determines an adapted injector characteristic curve, for example by shifting the injector characteristic curve in an axis direction by the first corrective value $K_1$. The control device 225 replaces the injector characteristic curve stored in the memory 220 with the determined adapted injector characteristic curve 205 of the first cylinder $Z_1$.

The control device 225 repeats the seventh to tenth method steps 330-345 for the second cylinder $Z_2$ and the further cylinders $Z_3$, $Z_4$ in order to adapt the injector characteristic curve of the injector of the second cylinder $Z_2$ and possibly of the further injectors of the further cylinders $Z_3$, $Z_4$.

It is alternatively also conceivable, instead of the repetition of the third to sixth method steps 310-325 and the subsequent repetition of the seventh to tenth method steps 330-345, for the control device 225 to perform the third to tenth method steps 310-345 in series, and to subsequently repeat the third to tenth method steps 310-345 for the further cylinders $Z_2$, $Z_3$, $Z_4$.

It is furthermore also conceivable for the method described in FIG. 3 to be combined with the method described in FIG. 2.

Accordingly, it is conceivable for the third to tenth method steps 310-345 to be performed after the tenth method step 340 of the method described in FIG. 2.

It is furthermore advantageous for the cylinder segment time duration $t_{S1}$, $t_{S2}$, $t_{S3}$ to be detected in each case in a high-pressure phase of the cylinder $Z_1$, $Z_2$, $Z_3$, $Z_4$.

After the tenth method step 345, the control device 225 progresses with an eleventh method step 350 and a twelfth method step 355, wherein the eleventh and twelfth method steps 350, 355 substantially correspond to the eleventh and twelfth method steps 350, 355 described in FIG. 2.

Although the invention has been illustrated and described in more detail by way of the exemplary embodiments, the invention is not restricted by the disclosed examples and other variations may be derived therefrom by a person skilled in the art without departing from the scope of protection of the invention.

LIST OF REFERENCE SIGNS

100 Drive system
105 Internal combustion engine
110 Electric machine
115 Control unit
120 Clutch device
125 Transmission device
130 Intake tract
135 Engine block
140 Cylinder head
145 Exhaust-gas tract
150 Throttle flap
155 Intake pipe
160 Manifold
165 Piston
170 Combustion chamber
175 Connecting rod
180 Crankshaft
185 Inlet valve
190 Outlet valve
195 First valve drive
200 Second valve drive
205 Injection valve
210 Ignition plug
215 Interface
220 Memory
225 Control device
230 First connection
235 Second connection
240 Crankshaft sensor
245 Third connection
250 Encoder wheel
255 Tooth
256 Gap
260 Sensor element
265 Fourth connection
275 Fifth connection
280 Sixth connection
300 First method step
305 Second method step
310 Third method step
315 Fourth method step
320 Fifth method step
325 Sixth method step
330 Seventh method step
335 Eighth method step
340 Ninth method step
345 Tenth method step
350 Eleventh method step
355 Twelfth method step
$t_{S1}$ First cylinder segment time duration
$t_{S2}$ Second cylinder segment time duration
$t_{S3}$ Cylinder segment time duration
$t_{S4}$ Cylinder segment time duration
$t_{S1}'$ Further first cylinder segment time duration
$\Delta t$ Cylinder segment duration difference
$\Delta t_{S1}$ Cylinder segment duration difference
n Predefined rotational speed
K Corrective value

The invention claimed is:

1. A method for determining a corrective value of a drive system and adapting the drive system, comprising:
providing a drive system having an electric machine and an internal combustion engine with at least a first cylinder and a crankshaft,
deactivating a fuel feed to at least the first cylinder of the internal combustion engine,
fixedly coupling the electric machine in terms of torque to the internal combustion engine,
actuating the electric machine such that the crankshaft of the internal combustion engine rotates at a predefined rotational speed,
detecting a first cylinder segment time duration, and assigning the first cylinder segment time duration to the first cylinder,
determining the corrective value in a manner dependent on the first cylinder segment time duration: and
adapting an injector characteristic of an injector of the first cylinder based upon the corrective value.

2. The method as claimed in claim 1, further comprising:
deactivating the fuel feed to a second cylinder of the internal combustion engine,
detecting a second cylinder segment time duration, and assigning the second cylinder segment time duration to the second cylinder, and
determining a cylinder segment duration difference from a reference time duration and the second cylinder segment time duration,
wherein determining the corrective value is based upon the cylinder segment duration difference.

3. The method as claimed in claim 2, further comprising:
comparing the cylinder segment duration difference with a predefined threshold value, and
in the event of the predefined threshold value being exceeded by the cylinder segment duration difference, determining the corrective value based upon the cylinder segment duration difference.

4. The method as claimed in claim 2, further comprising, on the basis of the corrective value and the second cylinder segment time duration, setting a corrected second cylinder segment time duration and detecting an irregularity in a combustion in the second cylinder.

5. The method as claimed in claim 4, further comprising:
setting the first cylinder segment time duration as a reference time duration, and
wherein the corrective value is determined such that the corrected second cylinder segment time duration is substantially adapted to the first cylinder segment time duration in the case of a constant rotational speed of the crankshaft.

6. The method as claimed in claim 1, further comprising:
activating a fuel feed to the first cylinder, and delivering a reduced quantity of fuel into the first cylinder,
detecting a further first cylinder segment time duration,
determining a further cylinder segment duration difference based upon a difference between the further first cylinder segment time duration and the first cylinder segment time duration,
wherein the corrective value is determined based on the further cylinder segment duration difference, and
wherein adapting an injector characteristic of an injector of the first cylinder is based on the corrective value which is based upon the further cylinder segment duration difference.

7. The method as claimed in claim 6, wherein, during the feed of the reduced fuel quantity into the first cylinder, the fuel feed to at least the second cylinder is activated or deactivated.

8. The method as claimed in claim 1, wherein the first cylinder segment time duration is detected in a high-pressure phase of the first cylinder.

9. The method as claimed in claim 1, wherein, the drive system is in a vehicle having a drivetrain, and during the determination of the corrective value, the internal combustion engine and the electric machine are decoupled from a transmission device in the drivetrain.

10. The method as claimed in claim 1, wherein the internal combustion engine comprises a plurality of cylinders, and after determination of the corrective value, the fuel feed to the cylinders is fully activated, and a power of the electric machine is reduced.

11. The method as claimed in claim 1, wherein the internal combustion engine comprises a plurality of cylinders, and after determination of the corrective value, the fuel feed to the cylinders is deactivated, and a power of the electric machine is reduced or increased or the electric machine is operated as a generator.

12. A control unit for a drive system having an electric machine and an internal combustion engine with at least a first cylinder and a crankshaft, the control unit configured to:
deactivate a fuel feed to at least the first cylinder of the internal combustion engine,
fixedly couple the electric machine in terms of torque to the internal combustion engine,
actuate the electric machine such that the crankshaft of the internal combustion engine rotates at a predefined rotational speed,
detect a first cylinder segment time duration, and assigning the first cylinder segment time duration to the first cylinder,
determine a corrective value in a manner dependent on the first cylinder segment time duration, and
adapt an injector characteristic curve of an injector of the first cylinder based upon the corrective value.

13. The control unit of claim 12, wherein the control unit is further configured to:
deactivate the fuel feed to a second cylinder of the internal combustion engine,
detect a second cylinder segment time duration, and assigning the second cylinder segment time duration to the second cylinder, and
determine a cylinder segment duration difference from a reference time duration and the second cylinder segment time duration,
wherein the corrective value is based upon the cylinder segment duration difference.

14. The control unit of claim 13, wherein the control unit is further configured to:
compare the cylinder segment duration difference with a predefined threshold value, and
in the event of the predefined threshold value being exceeded by the cylinder segment duration difference, determine the corrective value based upon the cylinder segment duration difference.

15. The control unit of claim 13, wherein the control unit is further configured to, on the basis of the corrective value and the second cylinder segment time duration, set a corrected second cylinder segment time duration and detect an irregularity in a combustion in the second cylinder.

16. The control unit of claim 15, wherein the control unit is further configured to set the first cylinder segment time duration as reference time duration, wherein the corrective value is determined such that the corrected second cylinder segment time duration is substantially adapted to the first cylinder segment time duration in the case of a constant rotational speed of the crankshaft.

17. The control unit of claim 12, wherein the control unit is further configured to:
activate a fuel feed to the first cylinder, and deliver a reduced quantity of fuel into the first cylinder,
detect a further first cylinder segment time duration, and
determine a further cylinder segment duration difference based upon a difference between the further first cylinder segment time duration and the first cylinder segment time duration,
wherein the corrective value is determined based on the further cylinder segment duration difference.

18. The control unit of claim 12, wherein the internal combustion engine comprises a plurality of cylinders, and after determining of the corrective value, the control unit performs one of
activating fuel feed to the cylinders and reducing power of the electric machine, and
deactivating the fuel feed to the cylinders, and the electric machine is operated as a generator.

* * * * *